United States Patent [19]
Whitell

[11] Patent Number: 5,340,033
[45] Date of Patent: Aug. 23, 1994

[54] GRANULAR MATERIAL SPREADER

[76] Inventor: David Whitell, 63 Bedridge Way NE., Calgary, Alberta, Canada, T3K 1M2

[21] Appl. No.: 805,991

[22] Filed: Dec. 9, 1991

[51] Int. Cl.$^5$ ............................................. A01C 19/00
[52] U.S. Cl. .................................. 239/676; 239/670; 239/681; 239/680; 239/685; 239/672; 239/661; 414/502; 414/313; 366/282
[58] Field of Search ............... 414/501, 502, 306, 313, 414/314; 239/650, 651, 661, 664, 668, 669, 670, 672, 671, 674, 676, 679, 680, 681, 685, 683, 680, 689; 222/168, 169, 172, 610, 623, 236, 239, 241, 242, 559, 565; 366/261, 279, 281, 282, 283, 284, 288, 309, 312

[56] References Cited

U.S. PATENT DOCUMENTS

| | | | |
|---|---|---|---|
| 1,275,332 | 8/1918 | Wallace | 239/672 |
| 3,071,382 | 1/1963 | De Biasi | 239/661 X |
| 3,195,742 | 7/1965 | Sime | 414/314 |
| 3,229,828 | 1/1966 | Kucera | 414/318 |
| 3,232,458 | 2/1966 | Freeman | 239/681 X |
| 3,339,759 | 9/1967 | Wellons | 415/305 |
| 3,905,585 | 9/1975 | Wallman | 366/282 |
| 3,993,225 | 11/1976 | Manni | 239/676 X |
| 4,438,873 | 3/1984 | Kaercher, Jr. | 222/616 |
| 4,451,192 | 5/1984 | Wood | 414/306 |

FOREIGN PATENT DOCUMENTS

| | | | |
|---|---|---|---|
| 159534 | 10/1954 | Australia | 239/670 |
| 837458 | 3/1970 | Canada . | |
| 1138426 | 12/1982 | Canada . | |
| 1468387 | 12/1966 | France | 239/684 |
| 6408721 | 7/1964 | Netherlands | 239/681 |
| 423333 | 4/1967 | Switzerland | 239/676 |
| 566127 | 12/1944 | United Kingdom | 239/684 |
| 977702 | 12/1964 | United Kingdom | 239/680 |

*Primary Examiner*—Frank E. Werner
*Attorney, Agent, or Firm*—Jerry T. Kearns

[57] ABSTRACT

A spreader for granular material such as sand comprises a trailer adapted to be pulled behind a vehicle such as a tractor or other utility vehicle. A frusto-conical bin forms a hopper for a granular material to be dispensed and directs the material into a spreader housing where the material is impelled outwardly through a discharge opening by a rotating impeller. The impeller and an orbital rotating bin sweep arm are driven by coaxial drive shafts via a belt and pulley mechanism. A frictional tire engages the upper rim of the bin and propels the sweep arm in an orbital path. The material discharge rate and discharge pattern are controllable by a slide gate and interchangeable cover plates which vary the size of the discharge opening. The impeller and bin sweep assembly may be driven by an internal motor or from the towing vehicle by a power take-off drive.

8 Claims, 5 Drawing Sheets

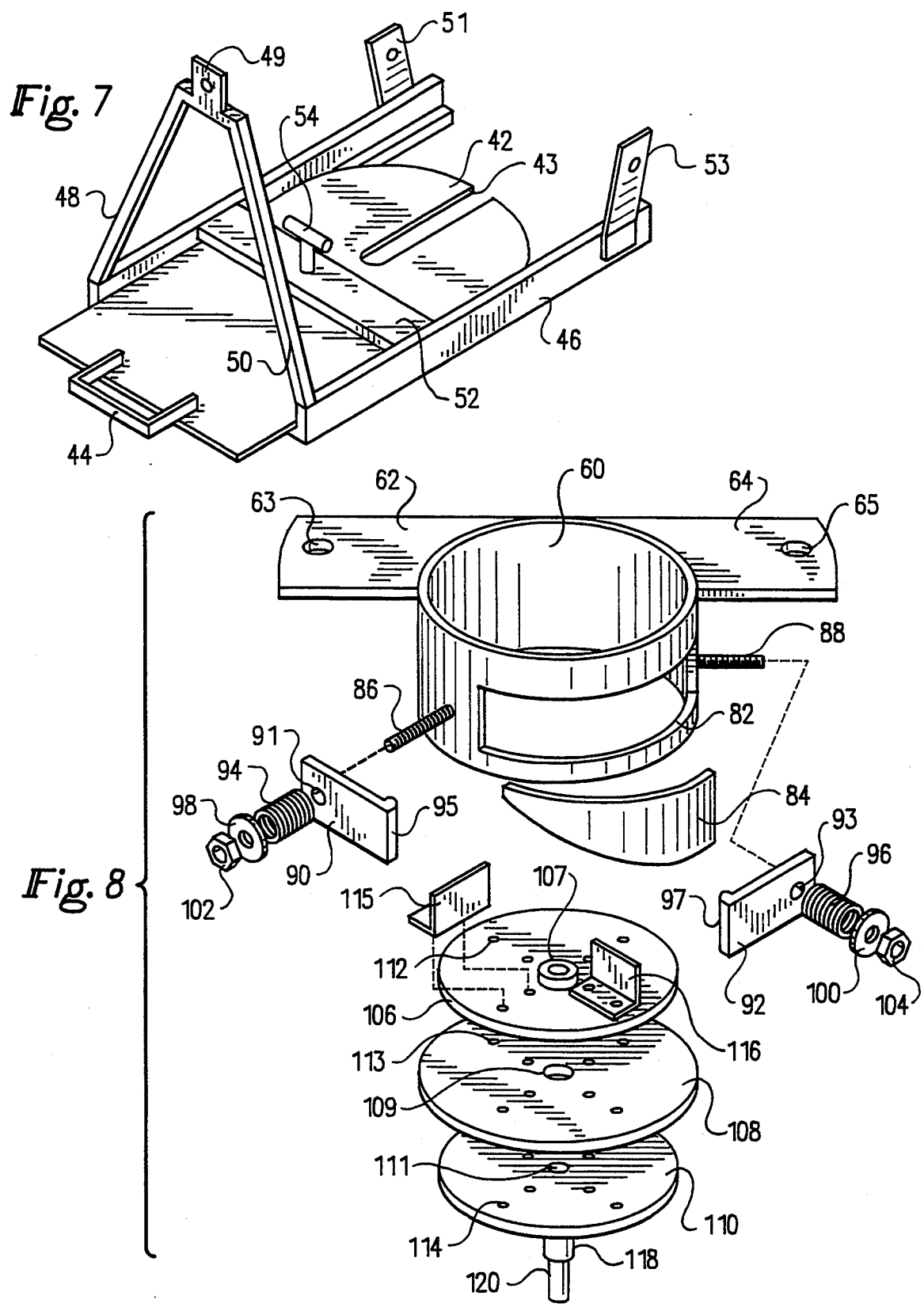

GRANULAR MATERIAL SPREADER

BACKGROUND OF THE INVENTION

Field of the Invention

The present invention relates to spreaders, and more particularly pertains to spreaders for granular materials such as sand, soil and peat moss. While the spreader of the present invention is intended principally for use as a sand and soil spreader, it may also be employed in connection with other granular material such as seed, fertilizer, grass clippings, gravel, salt, lime, etc.

SUMMARY OF THE INVENTION

Accordingly, it is an object of the present invention to provide a new and improved granular material spreader which allows a large volume of material to be rapidly spread over a wide area.

It is a further object of the present invention to provide a new and improved granular material spreader which is of a durable and reliable construction.

An even further object of the present invention is to provide a new and improved granular material spreader which may be rapidly refilled and easily moved by a towing vehicle.

Still another object of the present invention is to provide a new and improved granular material spreader having a gravity feed material bin including a sweep assembly for maintaining a constant and high rate of material delivery.

Yet another object of the present invention is to provide a new and improved granular material spreader which utilizes a rotary impeller in conjunction with a variable dimension discharge opening to allow regulation of the discharge rate and discharge pattern.

Even still another object of the present invention is to provide a new and improved granular material spreader utilizing a compact belt and pulley drive arrangement for a rotating spreader impeller and a rotating and orbital bin sweep assembly, in conjunction with an easily operable clutch system to allow selective disengagement of the drive.

A further object of the present invention is to provide a new and improved granular material spreader possessing a bin provided with a sweep assembly capable of homogeneously mixing two diverse materials, such as peat moss and sand or soil and seed, prior to spreading.

An additional object of the present invention is to provide a new and improved granular material spreader capable of uniformly spreading wet, soggy material such as sand.

In order to achieve these and other objects of the invention, the present invention provides an improved granular material spreader for granular material such as fertilizer which comprises a trailer adapted to be pulled behind a vehicle such as a tractor or other utility vehicle. A frusto-conical bin forms a supply hopper for a granular material to be dispensed and directs the material into a spreader housing where the material is impelled outwardly through a discharge opening by a rotating impeller. The impeller and an orbital rotating bin sweep arm are driven by coaxial drive shafts via a belt and pulley mechanism. A frictional tire engages the upper rim of the bin and propels the sweep arm in an orbital path. The material discharge rate and discharge pattern are controllable by a slide gate and interchangeable cover plates which vary the size of the discharge opening. The impeller and bin sweep assembly may be driven by an internal motor or from the towing vehicle by a power take-off drive.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIG. 7 is a perspective detail view illustrating the bin feed opening slide door assembly.

FIG. 8 is an exploded perspective detail view illustrating the rotary spreader impeller assembly, spread housing, spread door and spread door attachment.

DETAILED DESCRIPTION OF THE PREFERRED EMBODIMENT(S)

Figure 1:
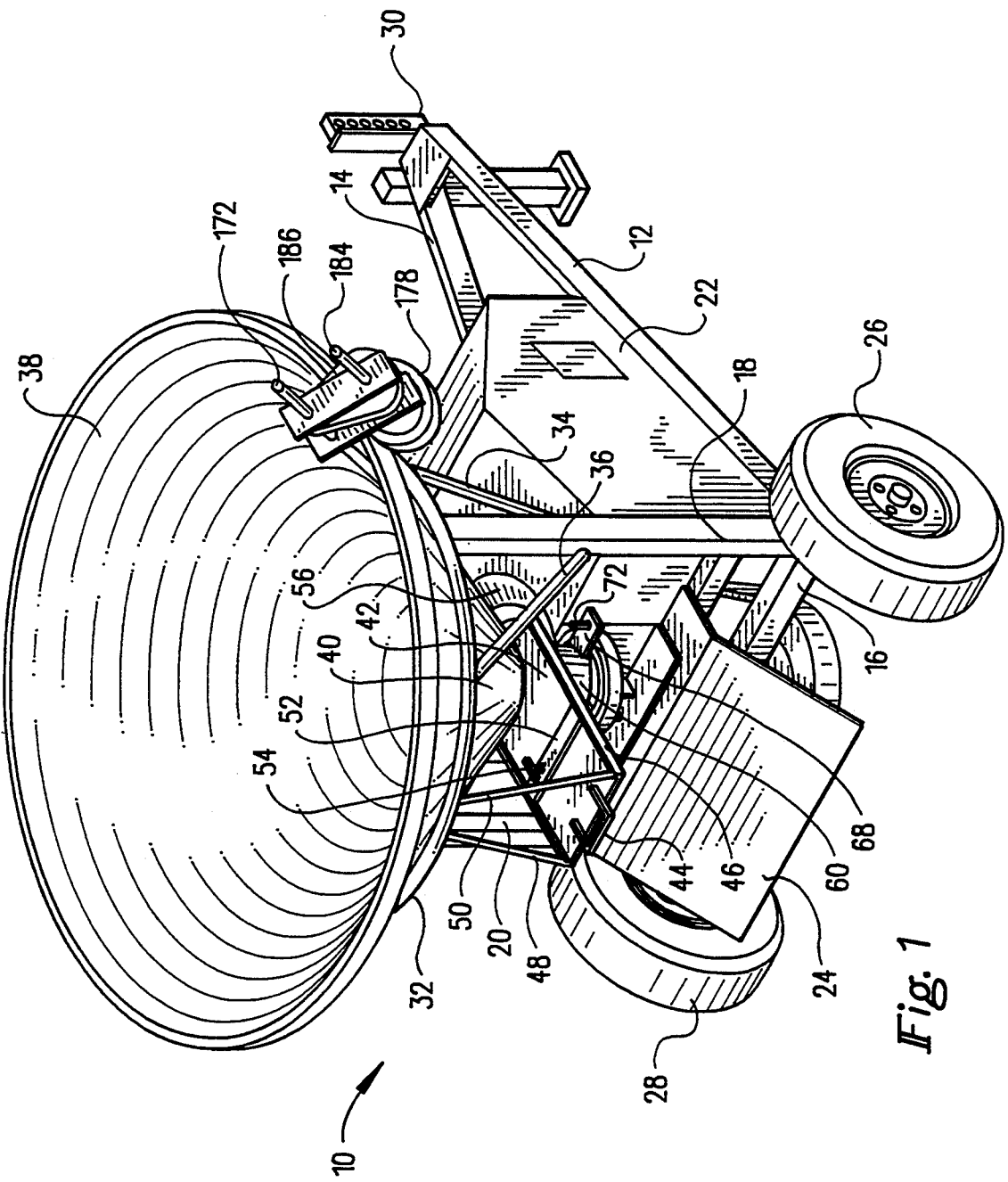
FIG. 1 is a perspective view of the spreader for granular material according to the present invention.

Referring now to the drawings, wherein like reference numerals designate corresponding structure throughout the views, and referring in particular to FIG. 1, an improved granular material spreader 10 according to a first preferred embodiment of the invention includes a substantially A-shaped frame formed by intersecting side rails 12 and 14 and transverse rail 16. A sheet metal housing 22 is secured to vertically extending posts 18 and 20, and to the frame rails 12 and 14. Sheet metal guards 24 connect to the spreader 10 for the purposes of shielding interior components of the machine. A pair of wheels 26 and 28 are rotatably mounted in a conventional manner at opposite rear corner portions of the spreader 10, such that the entire spreader 10 may be towed behind a vehicle, utilizing an adjustable trailer hitch 30. Example conventional towing vehicles may include CUSHMAN type utility vehicles, as well as conventional tractors. A circular support ring 32 is secured to posts 18 and 20 and reinforced by brace struts 34 and 36. It should be understood that the struts 34 and 36 are symmetrically formed on the post 20, as well as on the illustrated post 18. A frusto-conical fiberglass bin 38 supported within the ring 32 includes a smaller diameter feed opening 40 at a lower end thereof. A slide gate or valve assembly 42 is movable transversely across the feed opening 40, for the purpose of regulating the feed rate of a granular material from the bin 38. The slide gate 42 is mounted for transverse reciprocal adjustment in a guide track 46 secured by struts 48 and 50 to the bin 38. A handle 44 is provided to facilitate manual adjustment of the slide gate 42. A set screw 54 extends through a threaded aperture in a transverse bar 52 secured to the guide track 46. By tightening the set screw 54, the slide gate 42 may be secured in a selected adjusted position. A deflector pan 56 surrounds the discharge opening 40, and serves to direct granular material from the bin 38 into the spreader housing 60, into a rotary spreader assembly to be described subsequently, thus preventing material from spilling over onto the back of the machine. Additionally, the deflector pan 56 serves as an overflow protector in the event spreader housing 60 becomes excessively full, allowing excess material to spill out into the pan 56

Figure 2:
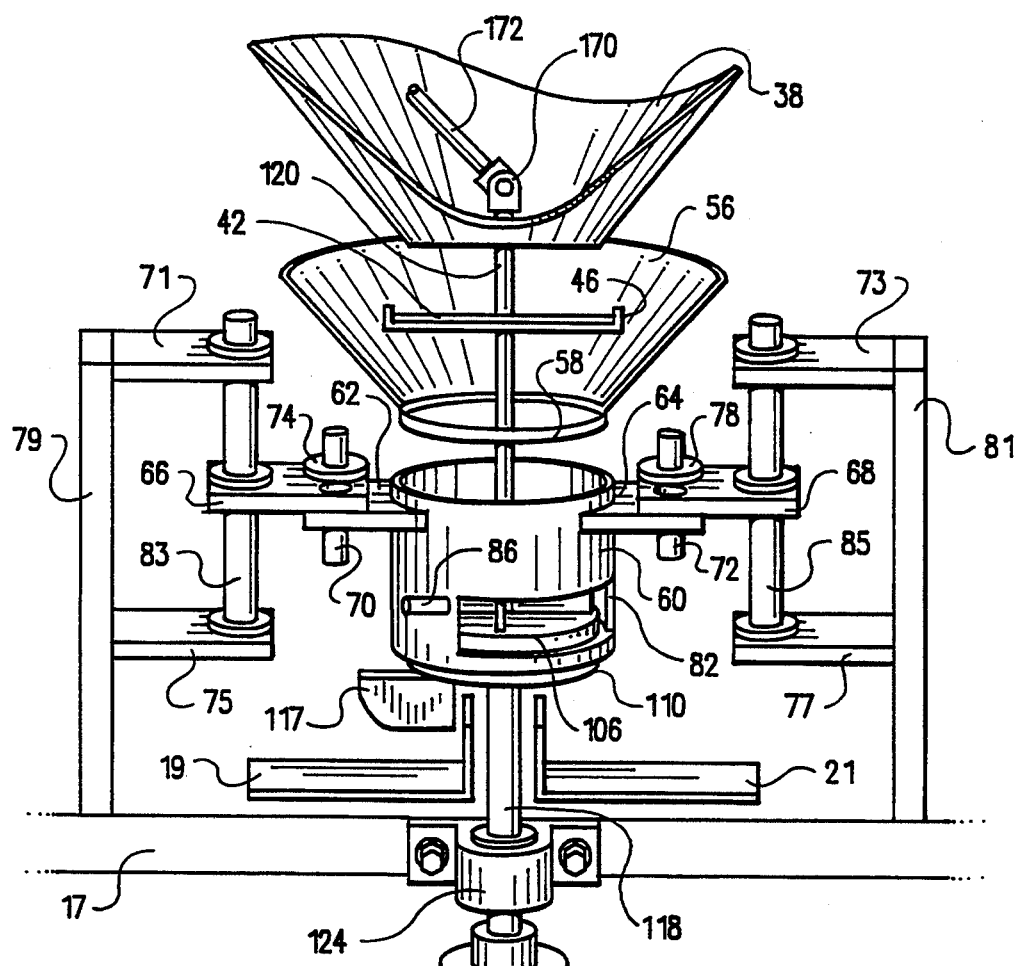
FIG. 2 is a partial exploded perspective detail view illustrating the components of the granular material spreader according to the present invention.
Figure 2:
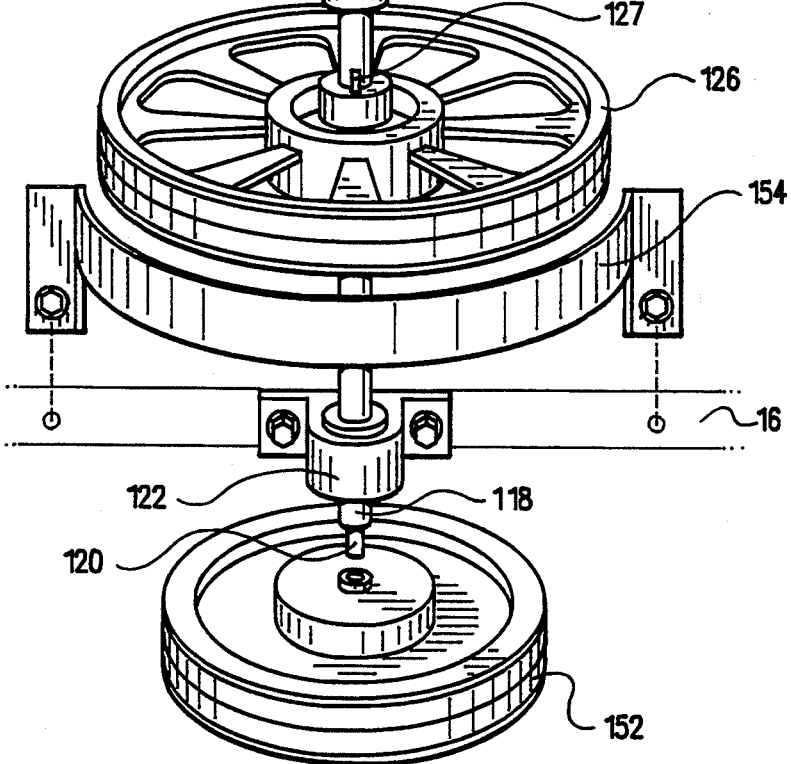

As shown in FIGS. 1, 2 and 8, a cylindrical spreader housing 60 possesses a pair of oppositely directed, outwardly extending tabs 62 and 64 provided with elongated holes 63 and 65, respectively. Cooperating tabs 66 and 68 are mounted for vertical sliding movement on pins 83 and 85, which are fixedly secured to the machine frame by members 71, 75, 79 and 73, 77, 81. The tab 62 is secured in a selected laterally adjusted position to the tab 66 by conventional threaded fasteners 70 and 74. The tabs 64 and 68 are similarly secured in overlying relation by threaded fasteners 72, 78 and butted together to provide for adjustment. Spreader housing 60 includes an arcuate discharge opening or window 82 formed by removal of a portion of the cylindrical side wall of the housing 60. A discharge opening cover plate 84 is secured in partial overlying relation over the discharge opening 82, to determine the spread pattern and also, to some extent, the material discharge rate. Preferably, a set of a plurality of differently dimensioned discharge opening cover plates 84 are provided, such that a user may regulate the discharge pattern by selection of an appropriate discharge opening cover plate. Threaded studs 86 and 88 extend outwardly from the housing 60, adjacent opposite ends of the discharge opening 82. Catch or clamping members 90 and 92 have respective circular apertures 91 and 93 dimensioned for insertion of the studs 86 and 88. Springs 94, 96, washers 98, 100 and nuts 102, 104 are utilized to secure the catch members 90 and 92 to the studs 86 and 88. The radiused lid portions 95 and 97 of the catch members 90 and 92 clampingly engage end portions of the discharge opening cover plate 84, to secure the cover plate 84 rigidly in partial overlying relation with respect to the discharge opening 82. Adjustment of the discharge pattern may be obtained by laterally positioning the cover plate 84 with respect to the clamping members 90 and 92.

A rotary impeller assembly includes disc-shaped circular plates 106, 108 and 110, as depicted in FIG. 8. Plates 106, 108 and 110 include respective coaxial apertures 107, 109 and 111 dimensioned for passage of coaxial drive shafts 118 and 120. Plates 106, 108 and 110 are secured together and to the outer drive shaft 118 for concurrent rotation therewith by conventional threaded fasteners passed through the series of coaxial aligned apertures 112, 113 and 114. A plurality of impeller fins, such as those illustrated at 115 and 116, are secured in circumferentially spaced relation on an upper surface of the plate 106 for rotation therewith. The impeller fins or blades 115 and 116 serve to pull or fling a granular material outwardly through the discharge opening 82 in the spreader housing 60. The spreader housing 60 has an annular bottom surface which rides upon the upper surface of the plate 108. The smaller diameter plate 106 and attached impeller blades 115 and 116 rotate within the interior of the spreader housing 60.

The bottom surface of the spreader housing 60 is thus a wear surface, which will eventually wear through, requiring replacement of the removable spreader housing 60. Because of the vertical sliding securement of the tabs 66 and 68 on the pins 70 and 72, as shown in FIG. 2, the spreader housing 60 falls downwardly, by virtue of gravity, such that the spreader housing 60 rests upon the plate 108.

As can be appreciated from FIG. 2, the outer drive shaft 118 is hollow and rotatably receives the smaller diameter inner drive shaft 120. The drive shaft 118 is rotatably supported by bearings 122 and 124 secured to vertically spaced frame members 16 and 17.

Figure 3:
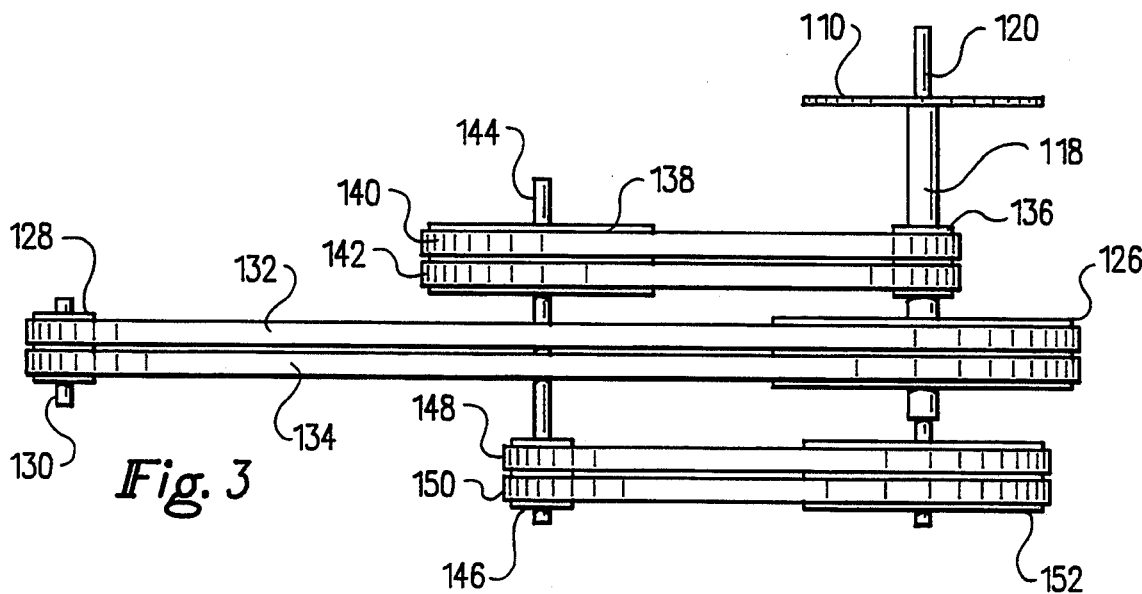
FIG. 3 is a side elevational detail view illustrating the belt and pulley drive system of the granular material spreader according to the present invention.

With reference now to FIGS. 2 and 3, the belt and pulley drive arrangement of the granular material spreader 10 according to the present invention will now be described. Main pulley 126 is driven by belts 132 and 134 in engagement with a drive pulley 128 mounted for rotation on a shaft 130. The shaft 130 may be driven in a variety of conventional ways, for example by gasoline or diesel powered motor mounted within the housing 22 shown in FIG. 1, or via a power take-off mechanism from a towing vehicle such as a tractor. If a power take-off mechanism is employed, suitable clutch mechanisms and angle drive arrangements, for example, bevel gears may be employed. A variety of conventional drive mechanisms are suitable for providing a rotary drive to the shaft 130. In any event, the pulley 128 is keyed for rotation with the driven shaft 130, which rotates the pulley 126 via drive belts 132 and 134. The pulley 126 is keyed for rotation with the outer drive shaft 118 by a shear pin 127, illustrated in FIG. 2. The pulley 126 thus rotates the drive shaft 118, and a pulley 136 keyed for rotation therewith. Rotating pulley 136 in turn drives a pulley 138 mounted for rotation on a shaft 144 via drive belts 140 and 142. An additional pulley 146 is mounted for rotation with the shaft 144 and serves to drive a pulley 152 keyed for rotation with the inner drive shaft 120, via a pair of drive belts 146 and 148. As may now be readily understood, the belt and pulley arrangement provides a gear reduction mechanism, such that the inner drive shaft 120 will be rotated at a speed substantially slower than the outer drive shaft 118. Suitable drive ratios may be determined by varying the diameter of the various pulleys, in a manner readily understood by those of ordinary skill in the art. Outer drive shaft 118 is secured, for example, by welding, to the plate 110, which as described previously with respect to FIG. 8, serves to rotate the impeller blades 115 and 116, and thus discharge a granular material (sand) through the discharge opening 82 in the spreader housing 60. The inner drive shaft 120 is utilized to power a rotary and orbital bin sweep assembly to be described in greater detail subsequently.

Figure 4:
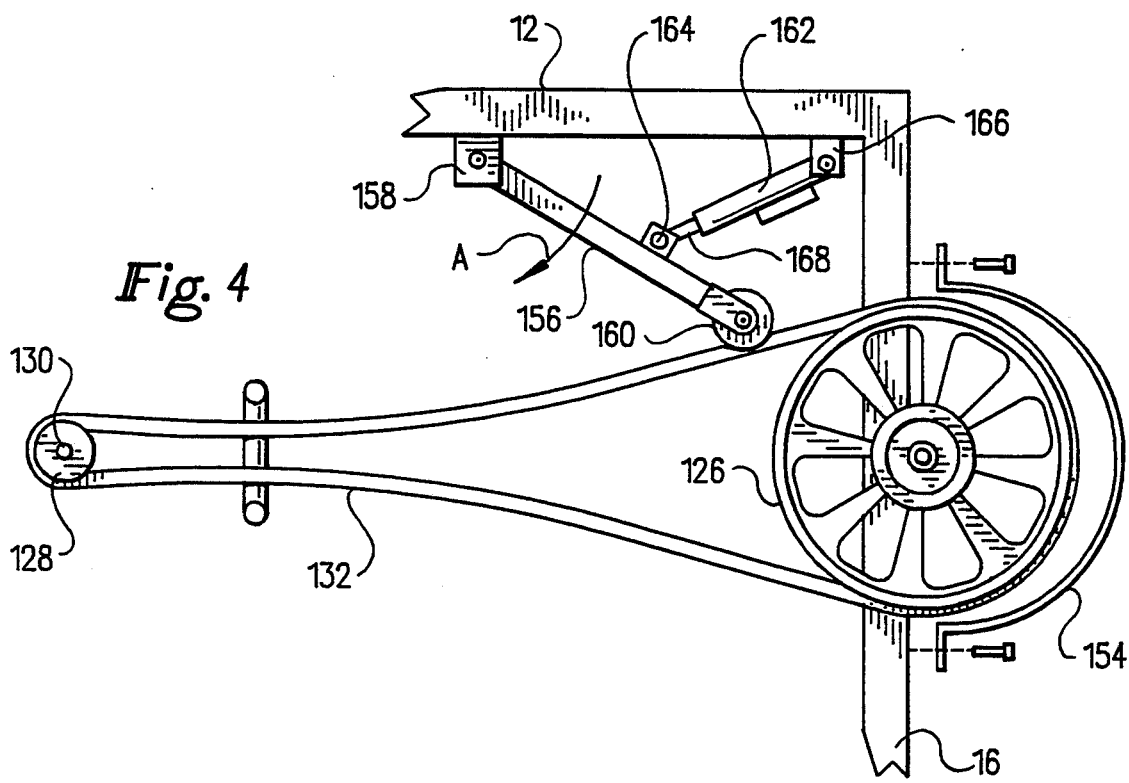
FIG. 4 is a top plan detail view illustrating the drive actuating mechanism of the granular material spreader according to the present invention.

For purposes of disengaging the drive, a pivotal belt tensioning mechanism is employed, as illustrated in FIG. 4. The pivotal arm 156 is mounted by a tab 158 to an inner side of the frame rail 12. A roller 160 is rotatably mounted at a distal end of the arm 156. A telescoping actuator has an outer barrel 162 and an inner rod 168. The free end of the inner rod 168 is pivotally mounted to the arm 156 at a tab 164. An opposite end of the barrel 162 is pivotally mounted to the frame rail 12 by a tab 166. The actuator 162 may be of an electromagnetic type, for example a solenoid, or may alternatively be a pneumatic or hydraulic cylinder, within the scope of the invention. Thus, by actuation of the actuator to extend the rod 168, the arm 156 will be pivoted in the direction indicated by arrow A, causing the roller 160 to tension the belt 132, and preventing the belt 132 from slipping on the pulleys 128 and 126. Although illustrated and described with respect to a single roller for tensioning a single belt, it should be understood that a bifurcated arm 156 is preferably employed, and provided with a pair of rollers 160, for engagement with both of the drive belts 132 and 134 depicted in FIG. 3. Because the pulley 126 drives the shaft 118 which indirectly drives the drive shaft 120, the actuator 162 is effective to disengage both the rotary impeller drive and the bin sweep mechanism.

With reference now to FIGS. 1, 2, 5 and 6, the rotary and orbital bin sweep mechanism will now be described. As shown in FIG. 2, the drive shaft 120 is connected for driving the bin sweep arm 172 in rotation via a universal joint 170.

Figure 6:
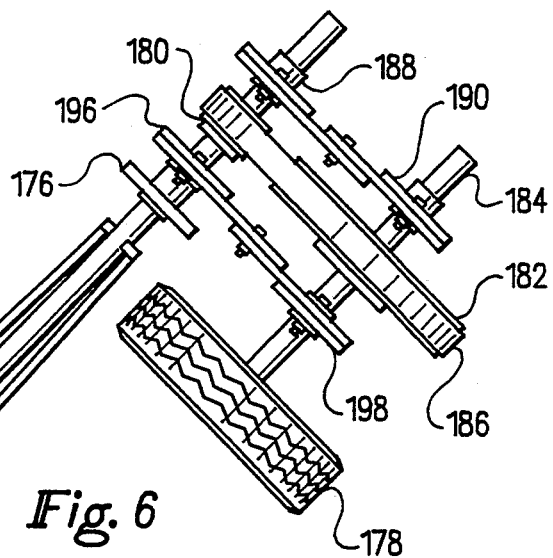
FIG. 6 is a detail view, further illustrating the bin sweep assembly.
Figure 6:
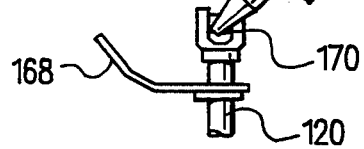

As seen in FIG. 6, a plurality of substantially triangular, tapering vanes 174, preferably three in number, are spaced evenly about the circumference of the bin sweep arm 172 and are secured for rotation therewith. Thus, as the drive shaft 120 is rotated, the bin sweep arm 172 and attached vanes 174 are rotated therewith in engagement with the frusto-conical interior surface of the bin 38. A small wiper arm 168 is secured to the upper end of the shaft 120, for the purpose of sweeping the surface of the bin 38 adjacent the bin feed opening 40 to alleviate bridging of the material across the opening 40.

Figure 5:
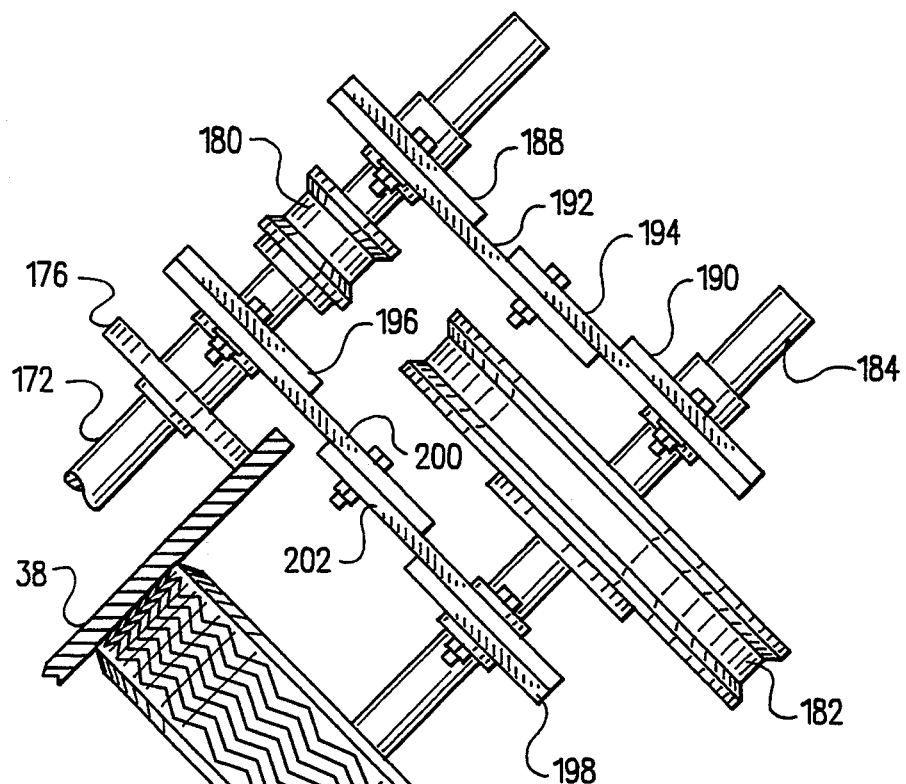
FIG. 5 is an enlarged detail view illustrating the frictional tire drive of the bin sweep assembly.
Figure 5:
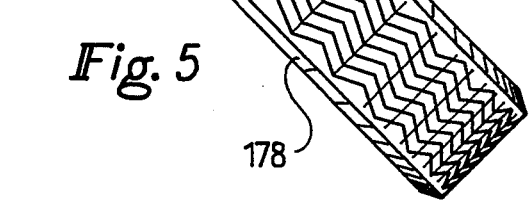

For the purpose of driving the bin sweep arm 172 orbitally about the central longitudinal axis of the drive shaft 120, a frictional tire 178 is employed. The tire 178 is driven via a belt and pulley mechanism, to be described hereinafter, in frictional engagement with an outer periphery of the bin 38, as can be appreciated from FIG. 1. As shown in FIGS. 5 and 6, the bin sweep arm 172 is provided with a pulley 180, while the tire 178 is mounted for rotation with a shaft 184 to which a pulley 182 is keyed for rotation. Thus, the pulley 180 drives the pulley 182 and shaft 184 via a belt 186. The bin sweep arm 172 is rotatably supported by bearings 188 and 196 secured respectively to plates 192 and 200. The axle 184 of the tire 178 is similarly rotatably mounted by bearings 190 and 198 secured to plates 194 and 202. As illustrated, the plates 192, 194 and 200, 202 are secured in overlying relation by conventional threaded fasteners. A roller 176 is mounted for free rotation by a bearing on the sweep arm 172. Thus, the bin side wall 38 is pinched between the roller 176 and tire 178, effecting a frictional driving engagement. As may now be understood, the sweep arm 172 will rotate about its own axis, thus rotating vanes 174 and providing a mixing action to the granular material within the bin 38. Additionally, the sweep arm 172 will simultaneously be orbitally driven about the perimeter of the bin 38 by frictional engagement of the tire 178 with the outer periphery of the bin 38. This provides a highly effective sweeping action which creates an even and rapid flow of material from the bin 38 through the bin feed opening 40, and to the spreader housing 60. By virtue of this construction, torsional or twisting force is transmitted between the sweep arm 172 and the axle 184 through the plates 200, 202 and 192, 194. This torsional force effects a frictional clamping of the bin wall 38 between the roller 176 and the tire 178. This is particularly the case when granular material within the bin 38 exerts a drag force on the vanes 174, and thus upon the sweep arm 172. The greater the drag force on the sweep arm 172, the greater the frictional force applied by the roller 176 and tire 178 to the bin wall 38.

As depicted in FIGS. 2 and 7, the discharge rate may be regulated by positioning of the slide gate 42 in a selected position to partially block the bin feed opening 40. The slide gate 42 is provided with a slot or notch 43 dimensioned for passage of the drive shaft 120. The slide track 46 mounting the slide plate 42 includes apertured securement tabs 49, 51 and 53 which are secured by conventional threaded fasteners to the bin 38. This insures proper alignment of the assembly with the bin 38, as contrasted with the alternative of securing the assembly to the machine frame. It should be understood that the bin 38 may contain as much as 2 tons of a granular material, such as wet sand. Thus, any flexure of the bin 38 under load would cause a dimensional shifting with respect to the frame of the machine, which might create binding or misalignment of the slide plate 42, if this assembly were secured to the frame rather than to the bin.

For purposes of directing any overflow of the granular material to the spreader housing 60, and also to the rear of the machine, a substantially conical deflector plate 56 is disposed between the bin 38 and the spreader housing 60. The deflector plate 56 has a cylindrical rim 58 which is inserted into the upper portion of the cylindrical spreader housing 60. To prevent excess granular material from fouling the working components of the machine, for example the bearings and pulley assembly, a wiper 117 is secured for rotation to an undersurface of the plate 110. Additionally, baffle plates 19 and 21 further shield the bearing assemblies. An additional guard 154 is secured to the frame member 16, and serves to shield the pulley 126. This guard 154 also acts to hold the drive belts 132, 134 in place against the pulley 126 when the clutch actuator 162, 168 (FIG. 4) is disengaged, thus slacking belts 132, 134. The guard 154 thus directs slack in the belts 132 and 134 toward the drive pulley 128, thus facilitating disengagement of the drive. As an added safety feature, the shear pin connection 127 of the pulley 126 to the drive shaft 118 prevents damage to the machine in the event the rotary impeller assembly is jammed by a rock or other obstruction. In this event, the shear pin 127 would fail, thus disengaging the drive. By then shutting off the machine and clearing the obstruction, the machine can be rapidly restored to working order by merely replacing the shear pin 127.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A granular material spreader, comprising:
  a frame;
  means supporting said frame for movement across a ground surface;
  a subbstantially frusto-conical supply bin on said frame having a feed opening;
  a spreader housing communicating with said feed opening and having a discharge opening;

a rotary impeller in said spreader housing for discharging granular material through said discharge opening;

a rotary and orbital elongated sweep arm in said bin;

a roller on a free end of said sweep arm engaging an inner surface of said bin;

a tire mounted for rotation with an idler shaft extending substantially parallel with said sweep arm, said tire frictionally engaging an outer surface of said bin;

means connecting said idler shaft and said sweep arm such that frictional engagement of said tire with said bin effects positive rotation of said sweep arm about its longitudinal axis; and common drive means including a pair of coaxial drive shafts connected respectively for driving said impeller in rotation and for driving said sweep arm rotationally and orbitally.

2. The granular material spreader of claim 1, further comprising a belt and pulley mechanism for driving said coaxial drive shafts at different speeds.

3. The granular material spreader of claim 1, further comprising an adjustable slide gate slidably received in a slide track secured to said bin for regulating a dimension of a feed opening of said bin for controlling a discharge rate of granular material.

4. The granular material spreader of claim 1, further comprising an adjustable cover plate for regulating a dimension of said discharge opening for controlling a discharge pattern of granular material.

5. A granular material spreader, comprising:

a frame;

means supporting said frame for movement across a ground surface;

a spreader housing including a discharge opening mounted on said frame;

a rotary impeller in said spreader housing for discharging granular material through said discharge opening;

said rotary impeller including a circular plate mounted for rotation with said impeller;

means for driving said impeller;

a granular material supply bin mounted on said frame and having a feed opening for communicating granular material from said bin to said impeller;

said spreader housing comprising a freely axially movable and rotationally fixed substantially cylindrical housing at least partially surrounding said impeller and riding upon an upper surface of said circular plate, said spreader housing communicating with said feed opening;

a rotary and orbital elongated sweep arm in said bin;

a roller on a free end of said sweep arm engaging an inner surface of said bin;

a tire mounted for rotation with an idler shaft extending substantially parallel with said sweep arm, said tire frictionally engaging an outer surface of said bin;

means connecting said idler shaft and said sweep arm such that frictional engagement of said tire with said bin effects positive rotation of said sweep arm about its longitudinal axis; and common drive means including a pair of coaxial shafts connected respectively for driving said impeller in rotation and for driving said sweep arm rotationally and orbitally.

6. The granular material spreader of claim 5, further comprising a belt and pulley mechanism for driving said coaxial drive shafts at different speeds.

7. The granular material spreader of claim 5, further comprising an adjustable slide gate slidably received in a slide track secured to said bin for regulating a dimension of said feed opening of said bin for controlling a discharge rate of granular material.

8. The granular material spreader of claim 5, further comprising an adjustable cover plate for regulating a dimension of said discharge opening for controlling a discharge pattern of granular material.

* * * * *